United States Patent
Meisels et al.

(10) Patent No.: US 10,552,799 B2
(45) Date of Patent: Feb. 4, 2020

(54) UPLOAD OF ATTACHMENT AND INSERTION OF LINK INTO ELECTRONIC MESSAGES

(75) Inventors: Joshua Adam Meisels, Seattle, WA (US); Daniel Paul Costenaro, Bellevue, WA (US); Jedidiah Brown, Seattle, WA (US); Marta Rey-Babarro, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/096,880

(22) Filed: Apr. 28, 2011

(65) Prior Publication Data

US 2012/0278404 A1    Nov. 1, 2012

(51) Int. Cl.
G06F 15/16 (2006.01)
G06Q 10/10 (2012.01)
H04L 12/58 (2006.01)

(52) U.S. Cl.
CPC .......... *G06Q 10/107* (2013.01); *H04L 51/08* (2013.01); *H04L 51/18* (2013.01)

(58) Field of Classification Search
CPC ...................................... H04L 12/58
USPC ....................................... 709/206
See application file for complete search history.

(56) References Cited

U.S. PATENT DOCUMENTS

| | | |
|---|---|---|
| 5,355,472 A | 10/1994 | Lewis |
| 5,787,480 A | 7/1998 | Scales et al. |
| 5,864,870 A * | 1/1999 | Guck |
| 5,903,723 A | 5/1999 | Beck ............................. 709/200 |
| 6,219,818 B1 | 4/2001 | Freivald et al. .............. 714/799 |
| 6,275,848 B1 | 8/2001 | Arnold |
| 6,275,850 B1 | 8/2001 | Beyda ........................... 709/206 |
| 6,314,425 B1 | 11/2001 | Serbinis et al. |
| 6,397,261 B1 | 5/2002 | Eldridge et al. |
| 6,405,225 B1 | 6/2002 | Apfel et al. |
| 6,493,758 B1 | 12/2002 | McLain ......................... 709/227 |
| 6,533,822 B2 | 3/2003 | Kupiec ......................... 715/253 |
| 6,687,741 B1 | 2/2004 | Ramaley et al. ............. 709/206 |
| 6,718,368 B1 | 4/2004 | Ayyadurai |

(Continued)

FOREIGN PATENT DOCUMENTS

| | | |
|---|---|---|
| CN | 1449525 A | 10/2003 |
| CN | 1749998 A | 3/2006 |

(Continued)

OTHER PUBLICATIONS

Office Action dated Jun. 20, 2012, issued in U.S. Appl. No. 13/096,899.

(Continued)

*Primary Examiner* — Douglas B Blair (57) ABSTRACT

An option is presented with an electronic message to automatically upload and permission an attachment to the electronic message. A single click may be received to upload the attachment to a shared location (e.g. network share, online service, and the like). Permissions may be automatically set for the message recipients of the electronic message. For example, a default set of permissions and/or custom permissions may be set for each of the recipients listed on the To:/Cc:/Bcc: lines. A link to the shared location may also be automatically inserted into the electronic message along with or in place of the attachment.

8 Claims, 8 Drawing Sheets

(56) References Cited

U.S. PATENT DOCUMENTS

| | | | |
|---|---|---|---|
| 6,763,496 B1 | 7/2004 | Hennings et al. | |
| 6,782,423 B1 | 8/2004 | Nakayama et al. | |
| 6,839,741 B1* | 1/2005 | Tsai | 709/217 |
| 6,883,009 B2 | 4/2005 | Yoo | |
| 6,948,131 B1 | 9/2005 | Neven et al. | |
| 6,954,934 B2 | 10/2005 | Kumar | |
| 6,978,276 B2 | 12/2005 | Demsky et al. | |
| 7,003,551 B2* | 2/2006 | Malik | 709/206 |
| 7,028,075 B2 | 4/2006 | Morris | 709/206 |
| 7,054,905 B1* | 5/2006 | Hanna et al. | 709/206 |
| 7,089,287 B2 | 8/2006 | Bellotti et al. | |
| 7,107,518 B2 | 9/2006 | Ramaley et al. | 715/235 |
| 7,113,948 B2* | 9/2006 | Jhingan et al. | |
| 7,127,670 B2 | 10/2006 | Bendik | 715/200 |
| 7,130,885 B2 | 10/2006 | Chandra et al. | 709/206 |
| 7,143,091 B2 | 11/2006 | Charnock et al. | |
| 7,178,099 B2 | 2/2007 | Meyer et al. | 715/210 |
| 7,194,514 B1 | 3/2007 | Yen et al. | 709/206 |
| 7,290,034 B2 | 10/2007 | Budd et al. | 709/206 |
| 7,353,232 B1 | 4/2008 | Kalucha et al. | |
| 7,392,280 B2 | 6/2008 | Rohall et al. | 709/201 |
| 7,401,291 B2 | 7/2008 | Ramaley et al. | |
| 7,409,394 B2 | 8/2008 | Lee | |
| 7,409,424 B2 | 8/2008 | Parker | 709/206 |
| 7,424,543 B2 | 9/2008 | Rice, III | |
| 7,424,676 B1 | 9/2008 | Carlson et al. | |
| 7,444,382 B2 | 10/2008 | Malik | |
| 7,509,386 B2 | 3/2009 | Miyashita | |
| 7,536,440 B2 | 5/2009 | Budd et al. | 709/206 |
| 7,546,352 B1 | 6/2009 | Sukadev et al. | |
| 7,565,409 B2 | 7/2009 | Heilbron et al. | |
| 7,580,982 B2 | 8/2009 | Owen et al. | |
| 7,593,943 B2 | 9/2009 | Clarke et al. | |
| 7,650,387 B2 | 1/2010 | Foo | 709/214 |
| 7,730,082 B2 | 6/2010 | Sah et al. | 707/770 |
| 7,752,269 B2 | 7/2010 | Chan et al. | |
| 7,783,711 B2 | 8/2010 | LeVasseur et al. | |
| 7,783,972 B2 | 8/2010 | Camps et al. | 715/255 |
| 7,814,425 B1 | 10/2010 | O'Shaugnessy | |
| 7,840,642 B2 | 11/2010 | Naick et al. | |
| 7,908,332 B2 | 3/2011 | Malik | |
| 7,917,591 B2 | 3/2011 | Vakkalanka | |
| 7,970,850 B1 | 6/2011 | Callanan et al. | |
| 8,108,464 B1 | 1/2012 | Rochelle et al. | |
| 8,140,975 B2 | 3/2012 | Lemay et al. | |
| 8,145,707 B2 | 3/2012 | Thayer et al. | |
| 8,176,123 B1 | 5/2012 | Wang et al. | |
| 8,185,591 B1 | 5/2012 | Lewis | |
| 8,196,029 B1 | 6/2012 | Rucker et al. | |
| 8,458,269 B2* | 6/2013 | Friedman et al. | 709/206 |
| 8,682,989 B2 | 3/2014 | Meisels et al. | |
| 8,965,983 B2 | 2/2015 | Costenaro et al. | |
| 9,137,185 B2 | 9/2015 | Costenaro et al. | |
| 9,165,285 B2 | 10/2015 | Schultz et al. | |
| 9,747,268 B2 | 8/2017 | Meisels et al. | |
| 2001/0051991 A1 | 12/2001 | Beyda et al. | |
| 2001/0054073 A1 | 12/2001 | Ruppert et al. | |
| 2002/0016818 A1* | 2/2002 | Kirani et al. | 709/203 |
| 2002/0059384 A1* | 5/2002 | Kaars | 709/206 |
| 2002/0062356 A1 | 5/2002 | Clarke et al. | |
| 2002/0065892 A1 | 5/2002 | Malik | |
| 2002/0107931 A1 | 8/2002 | Singh et al. | |
| 2002/0129056 A1 | 9/2002 | Conant et al. | |
| 2002/0133633 A1 | 9/2002 | Kumar | |
| 2002/0138586 A1 | 9/2002 | Paleiov et al. | |
| 2002/0143691 A1 | 10/2002 | Ramaley et al. | |
| 2002/0174010 A1* | 11/2002 | Rice, III | 705/14 |
| 2003/0028528 A1 | 2/2003 | Christensen et al. | |
| 2003/0028600 A1 | 2/2003 | Parker | |
| 2003/0055907 A1 | 3/2003 | Stiers | 709/206 |
| 2003/0112273 A1 | 6/2003 | Hadfield et al. | |
| 2003/0131062 A1 | 7/2003 | Miyashita | |
| 2004/0034688 A1* | 2/2004 | Dunn | 709/206 |
| 2004/0068545 A1 | 4/2004 | Daniell et al. | |
| 2004/0103044 A1 | 5/2004 | Vandewater et al. | 705/26.1 |
| 2004/0158607 A1 | 8/2004 | Coppinger et al. | 709/206 |
| 2004/0186894 A1 | 9/2004 | Jhingan et al. | 709/207 |
| 2004/0243672 A1 | 12/2004 | Markki et al. | |
| 2004/0261082 A1 | 12/2004 | Steere et al. | |
| 2005/0010799 A1 | 1/2005 | Kelley et al. | |
| 2005/0033813 A1 | 2/2005 | Bhogal et al. | |
| 2005/0044492 A1 | 2/2005 | Ramaley et al. | |
| 2005/0060382 A1 | 3/2005 | Spector | 709/213 |
| 2005/0091289 A1 | 4/2005 | Shappell et al. | |
| 2005/0114672 A1 | 5/2005 | Duncan et al. | |
| 2005/0122345 A1 | 6/2005 | Kim et al. | |
| 2005/0166154 A1 | 7/2005 | Wilson | 715/751 |
| 2005/0188026 A1 | 8/2005 | Hilbert et al. | 709/206 |
| 2005/0251443 A1 | 11/2005 | Chan et al. | 705/14.721 |
| 2005/0289221 A1 | 12/2005 | Steele | |
| 2006/0004819 A1 | 1/2006 | Claudatos et al. | |
| 2006/0020673 A1 | 1/2006 | Sorge et al. | |
| 2006/0031309 A1 | 2/2006 | Luoffo et al. | 709/206 |
| 2006/0075046 A1 | 4/2006 | Yozell-Epstein et al. | |
| 2006/0095527 A1 | 5/2006 | Malik | |
| 2006/0161516 A1 | 7/2006 | Clarke et al. | |
| 2006/0195526 A1 | 8/2006 | Lederer et al. | 709/206 |
| 2006/0206570 A1 | 9/2006 | Heidloff et al. | 709/206 |
| 2006/0224679 A1* | 10/2006 | Kikuchi | G06Q 10/107 709/206 |
| 2006/0242208 A1 | 10/2006 | Goldick | |
| 2006/0259524 A1 | 11/2006 | Horton | |
| 2006/0282762 A1 | 12/2006 | Diamond et al. | 715/235 |
| 2006/0294455 A1 | 12/2006 | Morris et al. | |
| 2007/0005717 A1 | 1/2007 | Thierry et al. | |
| 2007/0022166 A1 | 1/2007 | Bhogal et al. | 709/206 |
| 2007/0118598 A1 | 5/2007 | Bedi et al. | |
| 2007/0118794 A1 | 5/2007 | Hollander et al. | |
| 2007/0130259 A1 | 6/2007 | Daniell et al. | |
| 2007/0136816 A1 | 6/2007 | Lee et al. | |
| 2007/0143419 A1 | 6/2007 | Plas | 709/206 |
| 2007/0143425 A1 | 6/2007 | Kieselbach et al. | 709/206 |
| 2007/0168459 A1 | 7/2007 | Fujita et al. | |
| 2007/0192490 A1 | 8/2007 | Minhas | |
| 2007/0198913 A1 | 8/2007 | Terao et al. | |
| 2007/0208782 A1 | 9/2007 | Carter et al. | |
| 2007/0233794 A1 | 10/2007 | Singh | |
| 2007/0271344 A1* | 11/2007 | Danasekaran et al. | 709/206 |
| 2007/0271502 A1 | 11/2007 | Bedi et al. | |
| 2007/0283267 A1 | 12/2007 | Jeffrey et al. | |
| 2008/0005139 A1 | 1/2008 | Hysom et al. | |
| 2008/0028017 A1 | 1/2008 | Garbow et al. | |
| 2008/0059539 A1 | 3/2008 | Chin et al. | |
| 2008/0120382 A1 | 5/2008 | Heidloff et al. | |
| 2008/0244721 A1 | 10/2008 | Barrus | |
| 2008/0250474 A1 | 10/2008 | Bhogal et al. | |
| 2008/0256458 A1 | 10/2008 | Aldred et al. | |
| 2008/0281924 A1 | 11/2008 | Gadwale | 709/206 |
| 2008/0282159 A1 | 11/2008 | Vanderwende et al. | 715/700 |
| 2008/0288862 A1 | 11/2008 | Smetters et al. | |
| 2009/0006948 A1 | 1/2009 | Parker et al. | |
| 2009/0024931 A1 | 1/2009 | Bae | |
| 2009/0030919 A1 | 1/2009 | Brezina et al. | |
| 2009/0030997 A1 | 1/2009 | Malik | |
| 2009/0031245 A1 | 1/2009 | Brezina et al. | |
| 2009/0063520 A1 | 3/2009 | Kimura | |
| 2009/0094514 A1 | 4/2009 | Dargahl et al. | |
| 2009/0100109 A1 | 4/2009 | Turski et al. | |
| 2009/0157831 A1 | 6/2009 | Tian et al. | 709/206 |
| 2009/0187852 A1 | 7/2009 | Tsurata | |
| 2009/0210721 A1* | 8/2009 | Phillips | 713/182 |
| 2009/0248808 A1 | 10/2009 | Izumi et al. | 709/206 |
| 2009/0313256 A1 | 12/2009 | Konduri et al. | |
| 2009/0319618 A1 | 12/2009 | Affronti et al. | 709/206 |
| 2010/0011032 A1 | 1/2010 | Fukuoka | |
| 2010/0017701 A1 | 1/2010 | Bargeron et al. | 715/230 |
| 2010/0023492 A1 | 1/2010 | Lucas | |
| 2010/0057765 A1 | 3/2010 | Dispensa et al. | 707/102 |
| 2010/0057864 A1 | 3/2010 | Laird-McConnell | |
| 2010/0057872 A1 | 3/2010 | Koons et al. | |
| 2010/0070448 A1 | 3/2010 | Omoigui | |
| 2010/0070588 A1 | 3/2010 | Sinn et al. | |
| 2010/0082713 A1 | 4/2010 | Frid-nielsen et al. | 707/821 |
| 2010/0095198 A1 | 4/2010 | Bultrowicz et al. | 715/234 |

(56) References Cited

U.S. PATENT DOCUMENTS

| | | |
|---|---|---|
| 2010/0100566 A1 | 4/2010 | Hronopoulos |
| 2010/0106551 A1 | 4/2010 | Koskimies et al. |
| 2010/0125640 A1 | 5/2010 | Boddington et al. |
| 2010/0169295 A1 | 7/2010 | Kanomori |
| 2010/0169439 A1 | 7/2010 | O'Sullivan et al. |
| 2010/0169440 A1 | 7/2010 | O'Sullivan ............... 709/206 |
| 2010/0191774 A1 | 7/2010 | Mason et al. |
| 2010/0198927 A1 | 8/2010 | Tonnison et al. ........... 709/206 |
| 2010/0228611 A1 | 9/2010 | Shenfield |
| 2010/0228989 A1 | 9/2010 | Neystadt et al. |
| 2010/0235763 A1 | 9/2010 | Massand |
| 2010/0273456 A1 | 10/2010 | Wolovitz et al. |
| 2010/0281224 A1 | 11/2010 | Ho et al. |
| 2010/0306180 A1 | 12/2010 | Johnson et al. |
| 2010/0306330 A1* | 12/2010 | Friedman et al. .......... 709/206 |
| 2011/0055177 A1 | 3/2011 | Chakra et al. |
| 2011/0065419 A1 | 3/2011 | Book et al. |
| 2011/0066955 A1 | 3/2011 | Olson et al. |
| 2011/0113104 A1 | 5/2011 | Bhogal et al. |
| 2011/0119593 A1 | 5/2011 | Jacobson et al. |
| 2011/0145363 A1 | 6/2011 | Ananthanarayanan et al. |
| 2011/0161435 A1 | 6/2011 | Mancuso |
| 2011/0276897 A1 | 11/2011 | Crevier et al. |
| 2011/0295959 A1 | 12/2011 | Martin et al. |
| 2012/0095890 A1 | 4/2012 | Santarlas |
| 2012/0117159 A1* | 5/2012 | Chakra ............... G06Q 10/107 709/206 |
| 2012/0151379 A1 | 6/2012 | Schultz et al. |
| 2012/0192064 A1 | 7/2012 | Antebi et al. |
| 2012/0278281 A1 | 11/2012 | Meisels et al. |
| 2012/0278401 A1 | 11/2012 | Meisels et al. |
| 2012/0278402 A1 | 11/2012 | Limont et al. |
| 2012/0278403 A1 | 11/2012 | Costenaro et al. |
| 2012/0278405 A1 | 11/2012 | Costenaro et al. |
| 2012/0278407 A1 | 11/2012 | Meisels et al. |
| 2012/0284344 A1 | 11/2012 | Costenaro et al. |
| 2012/0284345 A1 | 11/2012 | Costenaro et al. |
| 2014/0173423 A1 | 6/2014 | Meisels et al. |
| 2016/0006832 A1 | 1/2016 | Costenaro et al. |
| 2016/0043976 A1 | 2/2016 | Schultz et al. |
| 2019/0138998 A1 | 5/2019 | Costenaro et al. |

FOREIGN PATENT DOCUMENTS

| | | |
|---|---|---|
| CN | 1753400 A | 3/2006 |
| CN | 1795654 A | 6/2006 |
| CN | 1831827 A | 9/2006 |
| CN | 1971553 A | 5/2007 |
| CN | 101009667 A | 8/2007 |
| CN | 101079846 A | 11/2007 |
| CN | 101655845 A | 2/2010 |
| CN | 101655870 A | 2/2010 |
| EP | 933712 A2 | 8/1999 |
| JP | H05135056 A | 6/1993 |
| JP | 08235231 A | 9/1996 |
| JP | 10269236 A | 10/1998 |
| JP | 11161584 A | 6/1999 |
| JP | 11345182 A | 12/1999 |
| JP | 2001043151 A | 2/2001 |
| JP | 2001307006 A | 11/2001 |
| JP | 2002049615 A | 2/2002 |
| JP | 2002091813 A | 3/2002 |
| JP | 2005011354 A | 1/2005 |
| JP | 2005025620 A | 1/2005 |
| JP | 2005084945 A | 3/2005 |
| JP | 2005129061 A | 5/2005 |
| JP | 2007501969 A | 2/2007 |
| JP | 2007213511 A | 8/2007 |
| JP | 2008-500646 | 1/2008 |
| RU | 2373653 C2 | 11/2009 |
| WO | 03052622 A2 | 6/2003 |
| WO | 2005027404 A1 | 3/2005 |
| WO | 2007-133504 | 11/2007 |
| WO | 2009023769 A1 | 2/2009 |
| WO | 2009158108 A2 | 12/2009 |
| WO | 2010041505 A1 | 4/2010 |
| WO | 2010104659 A2 | 9/2010 |

OTHER PUBLICATIONS

Office Action dated Sep. 7, 2012, issued in U.S. Appl. No. 12/963,0919.

Office Action dated Oct. 3, 2012, issued in U.S. Appl. No. 12/096,830.

Decouchant et al.; "Griffon: A Cooperative, Structured, Distributed Document Editor"; 1993; http://citeseerx.ist.psu.edu/viewdoc/download?doi=10.1.1.51.759&rep=rep1&type=pdf; 28 pages.

Devendorf, G.; "Outlook putting attachments in Sharepoint"; Feb. 13, 2008; http://my.advisor.com/blog/garydev.nsf/d6plinks/GDEF-7BSUA2; 5 pages.

Edholm, Y.; "Email Attachments: The Scourge of the Network"; Jul. 21, 2008; solutions-daily.com; http://www.solutions-daily.com/dsp_getFeaturesDetails.cfm?CID=691; 3 pg.s.

Gigaom.com; "*How to Use Adobe Acrobat for Online Document Reviews*"; Retrieved Date: Jan. 4, 2010; http://gigaom.com/collaboration/how-to-use-adobe-acrobat-for-online-document-reviews/; 8 pgs.

Hsieh, H., et al.; "Activity Links: Supporting Communication and Reflection about Action"; Center for the Study of Digital Libraries and Dept. of Computer Science, Texas A&M University, USA; HT '05 Sep. 6-9, 2005, Salzburg, AT; 10 pgs.

Jatowt, A., et al.; "Change Summarization in Web Collections"; University of Tokyo, Japan; 2004; accessed on or about Jan. 4, 2010 at http://citeseerx.ist.psu.edu/viewdoc/download?doi=10.1.1.73.7999&rep=rep1&type=pdf; 10 pgs.

Masternewmedia.org; "*Collaborative Document Review Online: PleaseReview*"; Retrieved Date: Jan. 4, 2010; http://www.masternewmedia.org/news/2005/06/02/collaborative_document_review_online_pleasereview.htm; 4 pgs.

McCoy, J., et al.; "SharePoint Workspace and the Office Document Cache"; Mar. 12, 2010-Sep. 29, 2010; retrieved Dec. 30, 2010, at http://blogs.msdn.com/b/sharepoint_workspace_development_team/archive/2010/03/12/sharepoint-workspace-and-the-office-document-cache.aspx; 2 pgs.

Microsoft Support; "Attachment Manager for Outlook"; accessed Jan. 7, 2011, at http://assistmyteam.com/downloads/manuals/AttachmentManager.pdf; 14 pgs.

Microsoft Support; "OL2000: Changing from Local Delivery to Server and Offline"; Oct. 8, 2003, rev. 1.0; accessed Jan. 7, 2011 at http://support.microsoft.com/kb/197651; 4 pgs.

Microsoft Support; "You may receive an 'Outlook blocked access to the following potentially unsafe attachments' message in Outlook"; Last Review: May 13, 2010; http://support.microsoft.com/kb/829982; 7 pgs.

Microsoft; "*Going beyond e-mail: Collaborating with Office*"; Retrieved Date: Jan. 4, 2010; http://office.microsoft.com/en-us/outlook-help/going-beyond-e-mail-collaborating-with-office-HA001017429.aspx; 10 pgs.

Office-Addins.com; "Attachments Processor for Microsoft Outlook"; accessed Jan. 6, 2011, at http://www.-office-addins.com/-outlook-addins/attachments-processor.html; 3 pgs.

phpBB—Free and Open Source Forum Software; "Display last edited time information"; accessed Jan. 6, 2011, at http://www.phpbb.com/community/viewtopic.php?f=46&t=589514; 7 pgs.

Redline-Software.com; "Outlook Connector for MDaemon"; accessed Jan. 6, 2011, at http://www.redline-software.com/eng/support/docs/mdaemon/c6s4.php; 7 pgs.

RSBR.de; "Outlook Attachment Sniffer"; accessed Jan. 6, 2011, at http://www.rsbr.de/Software/OASniffer/index.htm; 2 pgs.

Sharepoint Development; "How to show last modified workflow date in a column on the main list page"; Jul. 31, 2009-Aug. 4, 2009; accessed Jan. 6, 2011, at http://www.sharepointdev.net/sharepoint--design-customization/how-to-show-last-modified-workflow-date--in-a-column-on-the-main-list-page-5094.shtml; 4 pgs.

Thapa, S.; "Microsoft SharePoint 2010—Features and Benefits"; Dec. 1, 2010; EzineMark.com; 3 pgs.

(56) References Cited

OTHER PUBLICATIONS

The Daily Reviewer; "Outlook Shared Attachment as Hyperlink"; accessed Dec. 30, 2010, at http://thedailyreviewer.com/windowsapps/view/outlook-shared-attachment-as-hyperlink-11367085; 5 pgs.
U.S. Appl. No. 12/963,091, entitled *Shared Attachments*, filed Dec. 8, 2010.
U.S. Appl. No. 13/096,830 entitled *Making Document Changes by Replying to Electronic Messages*, filed Apr. 28, 2011.
U.S. Appl. No. 13/096,854 entitled *Presenting Links to Content as Attachments in Electronic Messages*, filed Apr. 28, 2011.
U.S. Appl. No. 13/096,869, entitled *Presenting Link Information Near Links Within Electronic Messages*, filed Apr. 28, 2011.
U.S. Appl. No. 13/096,899, entitled *Storing Metadata Inside File to Reference Shared Version of File*, filed Apr. 28, 2011.
U.S. Appl. No. 13/102,431, entitled *Changes to Documents are Automatically Summarized in Electronic Messages*, filed May 6, 2011.
U.S. Appl. No. 13/102,875, entitled *Setting Permissions for Links Forwarded in Electronic Messages*, filed May 6, 2011.
U.S. Appl. No. 13/096,936, entitled *Automatic Uploading of Attachment to a Shared Location*, filed Apr. 28, 2011.
Harmoni.ie; "*harmon.ie for SharePoint*"; accessed Apr. 1, 2011 at http://harmon.ie/SharePoint/Product/Features/CollaborateUsingDocuments; 3 pgs.
Lenahan, T.; "*5 New Google Docs Features You Might Have Missed*"; Apr. 6, 2010; http://www.makeuseof.com/tag/5-google-docs-features-making/; 9 pgs.
Egnyte.co; "*Cloud File Server Features—Complete List*"; accessed Dec. 30, 2010, at http://www.egnyte.co.uk/file-server/online-file-server-features.html; 5 pgs.
U.S. Appl. No. 13/096,910, entitled "Uploading Attachment to Shared Location and Replacing with a Link", filed May 12, 2012.
Docstoc; "OneClick: Email Large Documents Without Attaching Files"; retrieved Jan. 7, 2011, from http://www.docstoc.com/oneclick/; 4 pgs.
Masternewmedia.com; "How to Send Large Files without Email"; Last updated: Jan. 6, 2011; retrieved Jan. 7, 2011, from http://www.masternewmedia.org/how_to_send_large_files_without_email/; 3 pgs.
MSDN.com; "How to Share Large Files Without Attaching Them"; Aug. 21, 2008; retrieved Jan. 7, 2011, from http://blogs.msdn.com/b/outlook/archive/2008/08/21/how-to-share-large-files-without-attaching-them.aspx; 3 pgs.
Sendthisfile.com; "Welcome to SendThisFile"; accessed Jan. 7, 2011, from http://www.sendthisfile.com/; 1 pg.
PCT Search Report in PCT/US2012/035710 dated Sep. 28, 2012.
Office Action dated Nov. 13, 2012, issued in U.S. Appl. No. 13/096,910.
Office Action dated Feb. 11, 2013, issued in U.S. Appl. No. 13/096,899.
PCT Search Report in PCT/US2012/035707 dated Nov. 26, 2012.
PCT Search Report in PCT/US2012/035708 dated Nov. 26, 2012.
PCT Search Report in PCT/US2012/035709 dated Nov. 26, 2012.
PCT Search Report in PCT/US2012/036701 dated Nov. 28, 2012.
PCT Search Report in PCT/US2012/036702 dated Dec. 3, 2012.
Office Action dated Nov. 21, 2012, issued in U.S. Appl. No. 13/096,936.
Office Action dated Nov. 26, 2012, issued in U.S. Appl. No. 13/102,431.
Office Action dated Dec. 11, 2012, issued in U.S. Appl. No. 13/096,854.
Office Action dated Dec. 14, 2012, issued in U.S. Appl. No. 13/096,869.
Office Action dated Jan. 2, 2013, issued in U.S. Appl. No. 13/102,875.
Office Action dated Jan. 9, 2013, issued in U.S. Appl. No. 12/963,091.
Wikipedia, Message, http://en.wikipedia.org/wiki/Message retrieved Jan. 9, 2014, p. 1-2.
Office Action dated Apr. 8, 2014, issued in U.S. Appl. No. 13/102,431, 16 pgs.
Office Action dated Jun. 16, 2014, issued in U.S. Appl. No. 12/963,091, 22 pgs.
Office Action dated Jul. 10, 2014, issued in U.S. Appl. No. 13/096,869, 29 pgs.
Office Action dated Jul. 16, 2014, issued in U.S. Appl. No. 13/102,431, 20 pgs.
Office Action dated Aug. 14, 2014, issued in U.S. Appl. No. 13/096,854, 32 pgs.
EP Extended Search Report in PCT/US2012/036702 dated Aug. 12, 2014, 6 pgs.
Office Action dated Jun. 4, 2013, issued in U.S. Appl. No. 13/096,936.
Office Action dated Jun. 10, 2013, issued in U.S. Appl. No. 13/102,431.
Office Action dated Jun. 11, 2013, issued in U.S. Appl. No. 13/096,910.
Office Action dated Jun. 20, 2013, issued in U.S. Appl. No. 13/096,854.
Office Action dated Jun. 21, 2013, issued in U.S. Appl. No. 13/096,830.
Office Action dated Jun. 21, 2013, issued in U.S. Appl. No. 13/096,869.
Office Action dated Sep. 24, 2013, issued in U.S. Appl. No. 13/096,899.
Office Action dated Nov. 22, 2013, issued in U.S. Appl. No. 13/102,875.
Office Action dated Jan. 15, 2014, issued in U.S. Appl. No. 13/096,854.
Office Action dated Jan. 31, 2014, issued in U.S. Appl. No. 13/096,869.
EP Search Report in PCT/US2012/036701 dated Dec. 4, 2014, 5 pgs.
EP Extended Search Report in PCT/US2012/035707 dated Oct. 21, 2014, 6 pgs.
Troost et al., Internet Engineering Task Force, RFC 2183 dated Aug. 1997, 12 pgs. available at: www.rfc-editor.org/rfc/rfc2183.txt.
Notice of Allowance dated Oct. 14, 2014 issued in U.S. Appl. No. 13/102,431, 51 pgs.
EP Extended Search Report in PCT/US2012/035708 dated Aug. 29, 2014, 6 pgs.
EP Extended Search Report in PCT/US2012/035709 dated Sep. 22, 2014, 6 pgs.
Office Action dated Sep. 25, 2014, issued in U.S. Appl. No. 12/963,091, 24 pgs.
Office Action dated Sep. 26, 2014, issued in U.S. Appl. No. 13/096,936, 29 pgs.
Office Action dated Oct. 7, 2014, issued in U.S. Appl. No. 13/096,910, 32 pgs.
Office Action dated Oct. 23, 2014, issued in U.S. Appl. No. 13/096,899, 24 pgs.
U.S. Appl. No. 14/853,098, entitled "Uploading Attachment to Shared Location and Replacing with a Link", filed Sep. 14, 2015.
Vogel et al., "Consistency Control for Synchronous and Asynchronous Collaboration Based on Shared Objects and Activities"; Computer Supported Copperative Work (CSCW); Kluwer Academic Publishers, vol. 13, No. 5-6; Dec. 1, 2004; pp. 573-602 (cited in Apr. 23, 2015 EP Comm.).
EP Communication dated Apr. 23, 2015 in Appln No. PCT/US2012/035710, 8 pgs.
Office Action dated Apr. 9, 2015, issued in U.S. Appl. No. 13/096,936, 23 pgs.
Notice of Allowance dated Apr. 28, 2015, issued in U.S. Appl. No. 13/096,910, 23 pgs.
Notice of Allowance dated Jun. 15, 2015, issued in U.S. Appl. No. 12/963,091, 28 pgs.
Office Action dated Jun. 23, 2015, issued in U.S. Appl. No. 13/096,899, 30 pgs.
Office Action dated Jun. 26, 2015, issued in U.S. Appl. No. 13/096,854, 50 pgs.
Office Action dated Sep. 21, 2015, issued in U.S. Appl. No. 13/102,875, 53 pgs.
U.S Appl. No. 14/887,086, entitled Shared Attachments, filed Oct. 19, 2015.
Chinese Office Action and Search Report Issued in Chinese Patent Application No. 201280020368.3 dated Dec. 2, 2015, 14 pgs.

(56) References Cited

OTHER PUBLICATIONS

Chinese Office Action and Search Report Issued in Patent Application No. 201280021905.6, dated Dec. 2, 2015, 14 pgs.
Office Action dated Nov. 23, 2015, issued in U.S. Appl. No. 13/096,936, 21 pgs.
Office Action dated Jan. 5, 2016, issued in U.S. Appl. No. 13/096,899, 19 pgs.
Chinese Office Action and Search Report Issued in Chinese Patent Application No. 201280020441.7, dated Dec. 15, 2015, 18 Pages.
Chinese Office Action dated Dec. 29, 2015 in Appln No. 201280021954.x, 16 pgs.
Chinese Office Action dated Feb. 1, 2016 in Appln No. 201280020342.9, 12 pgs.
Chinese Office Action dated Mar. 4, 2016 in Appln No. 201280020430.9, 11 pgs.
European Office Action Issued in Application No. 12777397.6, dated Mar. 3, 2016, 6 pgs.
Japanese Office Action Issued in Patent Application No. 2014-508168, dated Mar. 23, 2016, 8 Pages.
Japanese Office Action Issued in Patent Application No. 2014-508169, dated Feb. 10, 2016, 11 Pages.
Japanese Office Action Issued in Patent Application No. 2014-508170, dated Mar. 22, 2016, 5 Pages.
Japanese Office Action Issued in Patent Application No. 2014-508171, dated Mar. 11, 2016, 6 Pages.
Taiwan Office Action and Search Report Issued in Taiwan Patent Application No. 101110617, dated Mar. 21, 2016, 6 Pages.
U.S. Appl. No. 13/096,854, Office Action dated May 2, 2016, 35 pgs.
U.S. Appl. No. 13/096,936, Office Action dated Mar. 22, 2016, 20 pgs.
U.S. Appl. No. 13/102,875, Office Action dated Apr. 20, 2016, 22 pgs.
U.S. Appl. No. 14/188,666, Office Action dated Feb. 26, 2016, 77 pgs.
Toyoko Abe et al.; "Object Bulletin Board for Group Cooperative Work" printed in a collection of papers (1997-2006 Version 1.1) presented at DICOMO symposium sponsored by Information Processing Society of Japan on Aug. 31, 2006 (pp. 513-518) (DVD-ROM), 8 pages.
Japanese Office Action Issued in Patent Application No. 2014-510384, dated May 9, 2016, 6 Pages.
Russian Office Action Issued in Patent Application No. 2013149178, dated May 20, 2016, 9 Pages. With English Translation.
Australian Office Action Full Examination Report Issued in Patent Application No. 2012253808, dated Jul. 3, 2016, 3 Pages.
Chinese Office Action Issued in Patent Application No. 201280021905.6, dated Jul. 1, 2016, With english translation. 10 pgs.
Japanese Notice of Allowance Issued in Patent Application No. 2014-508169, dated Jul. 12, 2016, 3 Pages. Without English Translation.
Japanese Office Action Issued in Patent Application No. 2014-510385, dated May 30, 2016, With English translation. 9 Pages.
"Office Action Issued in Korean Patent Application No. 10-2013-7028223", dated Dec. 24, 2018, 5 Pages.
"Final Office Action Issued in Korean Patent Application No. 1020137028277", dated Nov. 19, 2018, 6 Pages.
"Final Office Action Issued in U.S. Appl. No. 13/096,899", dated Dec. 5, 2018, 18 Pages.
Office Action Issued in Chinese Patent Application No. 201280020342.9, dated Oct. 31, 2016, 11 Pages.
Office Action Issued in Chinese Patent Application No. 201280020368.3, dated Dec. 27, 2016, 10 Pages.
Office Action Issued in Chinese Patent Application No. 201280021905.6, dated Nov. 29, 2016, 11 Pages.
Second Office Action and Search Report Issued in Chinese Patent Application No. 201280020430.9, dated Nov. 1, 2016, 11 Pages.
JP: Office Action Issued in Japanese Patent Application No. 2014-508168, dated Oct. 7, 2016, 8 Pages.
JP: Notice of Allowance Issued in Japanese Patent Application No. 2014-508171, dated Aug. 4, 2016, 4 Pages.
AU: Office Action Issued in Australian Patent Application No. 2012253808, dated Sep. 16, 2016, 3 Pages.
U.S. Appl. No. 14/188,666, Office Action dated Oct. 25, 2016, 24 pgs.
U.S. Appl. No. 13/096,854, Office Action dated Jan. 11, 2017, 39 pgs.
U.S. Appl. No. 13/102,875, Office Action dated Nov. 14, 2016, 27 pgs.
Taiwan Office Action and Search Report Issued in Taiwan Patent Application No. 101110617, dated Jul. 26, 2016, 7 Pages.
Japanese Notice of Allowance Issued in Patent Application No. 2014-508170, dated Sep. 13, 2016, 3 Pages.
Third Office Action Issued in Chinese Patent Application No. 201280020441.7, dated Jan. 25, 2017, 10 Pages.
Chinese Office Action Issued in Patent Application No. 201280020342.9, dated Aug. 1, 2016, With English translation. 10 pages.
Chinese Second Office Action and Search Report Issued in Chinese Patent Application No. 201280020368.3, dated Aug. 5, 2016, 10 pages. With English Translation.
Chinese Second Office Action dated Aug. 29, 2016 in Application No. 201280021954.x, 5 pages.
Chinese Second Office Action Issued in Chinese Patent Application No. 201280020441.7, dated Aug. 1, 2016, 14 Pages. With English Translation.
European Office Action Issued in Application No. 12782951.3, dated Aug. 17, 2016, 6 pages.
U.S. Appl. No. 13/096,899, Office Action dated Sep. 26, 2016, 36 pages.
"Office Action Issued in Korean Patent Application No. 10-2013-7028277", dated Jan. 21, 2019, 6 Pages.
"Oral Hearing Issued in European Patent Application No. 12777397.6", dated Jan. 16, 2019, 8 Pages.
"Office Action Issued in Canadian Patent Application No. 2,835,323", dated Sep. 17, 2018, 4 Pages.
"How to Forward Emails—As Attachments", Retrieved From: http://web.archive.org/web/20090732111523/http://www.readnotify.com/readnotify/attachment.asp, Jul. 2, 2009, 7 Pages.
"Office Action Issued in Korean Patent Application No. 10-2013-7028277", dated Oct. 21, 2017, 11 Pages.
"Office Action Issued in Korean Patent Application No. 10-2013-7028277", dated Apr. 30, 2018, 5 Pages.
"Office Action Issued in Korean Patent Application No. 10-2013-7028280", dated Oct. 21, 2017, 11 Pages.
"Office Action Issued in Korean Patent Application No. 10-2013-7028280", dated May 21, 2018, 14 Pages.
"Office Action Issued in Korean Patent Application No. 10-2013-7028430", dated Oct. 23, 2017, 6 Pages. (Without Translation).
"Office Action Issued in Korean Patent Application No. 10-2013-7028430", dated May 14, 2018, 05 Pages.
"Office Action Issued in Korean Patent Application No. 10-2013-7028430", dated Jun. 28, 2018, 08 Pages.
"Final Office Action Issued in Korean Patent Application No. 10-2013-7029294", dated May 28, 2018, 05 Pages.
"Office Action Issued in Korean Patent Application No. 10-2013-7029294", dated Oct. 23, 2017, 10 Pages.
"Office Action Issued in Korean Patent Application No. 10-2013-7029310", dated Nov. 27, 2017, 7 Pages.
"Office Action Issued in European Patent Application No. 12776501.4", dated Jun. 6, 2018, 7 Pages.
"Office Action Issued in European Patent Application No. 12777074.1", dated Oct. 16, 2017, 7 Pages.
"Office Action Issued in European Patent Application No. 12777397.6", dated Jan. 3, 2018, 6 Pages.
"Oral Hearing Issued in European Patent Application No. 12782951.3", dated Feb. 13, 2018, 7 Pages.
"Final Office Action Issued in U.S. Appl. No. 13/096,854", dated Jul. 23, 2018, 25 Pages.
"Final Office Action Issued in U.S. Appl. No. 13/096,854", dated Jun. 29, 2017, 29 Pages.
"Non Final Office Action Issued in U.S. Appl. No. 13/096,854", dated Dec. 28, 2017, 29 Pages.

(56) References Cited

OTHER PUBLICATIONS

"Final Office Action Issued in U.S. Appl. No. 13/096,899", dated Aug. 15, 2017, 24 Pages.
"Non Final Office Action Issued in U.S. Appl. No. 13/096,899", dated Mar. 19, 2018, 20 Pages.
"Final Office Action Issued in U.S. Appl. No. 13/102,875", dated Jul. 5, 2017, 19 Pages.
"Non Final Office Action Issued in U.S. Appl. No. 13/102,875", dated Mar. 16, 2018, 18 Pages.
"Final Office Action Issued in U.S. Appl. No. 14/853,098", dated Feb. 8, 2018, 11 Pages.
"Non Final Office Action Issued in U.S. Appl. No. 14/853,098", dated Aug. 4, 2017, 12 Pages.
"Final Office Action Issued in U.S. Appl. No. 14/887,086", dated Jan. 26, 2018, 19 Pages.
"Non Final Office Action Issued in U.S. Appl. No. 14/887,086", dated Oct. 6, 2017, 16 Pages.
"Office Action Issued in Canadian Patent Application No. 2,835,323", dated Jan. 25, 2018, 4 Pages.
"Decision of Re-Examination Issued in Chinese Application No. 201280020342.9", dated Mar. 30, 2018, 15 Pages.
"Notice of Re-Examination Issued in Chinese Application No. 201280020342.9", dated Sep. 29, 2017, 11 Pages.
"Notice of Re-Examination Issued in Chinese Application No. 201280020368.3", dated Nov. 6, 2017, 10 Pages.
"Notice of Re-Examination Issued in Chinese Application No. 201280020368.3", dated Apr. 8, 2018, 18 Pages.
"Decision on Rejection Issued in Chinese Patent Application No. 201280020430.9", dated Feb. 27, 2017, 8 Pages.
"Office Action Issued in Chinese Patent Application No. 201280020441.7", dated Jun. 2, 2017, 12 Pages.
"Office Action Issued in Chinese Patent Application No. 201280020441.7", dated May 4, 2018, 8 Pages.
"Decision on Reexamination Issued in U.S. Patent Application No. 201280021905.6", dated Jan. 29, 2018, 14 Pages.
"Office Action Issued in Chinese Patent Application No. 201280021905.6", dated Sep. 19, 2017, 13 Pages.
"Office Action Issued in Japanese Patent Application No. 2014-510384", dated Oct. 13, 2016, 6 Pages.
Office Action Issued in Korean Patent Application No. 10-2013-7028223, dated Jul. 17, 2018, 9 Pages.

\* cited by examiner

UPLOAD OF ATTACHMENT AND INSERTION OF LINK INTO ELECTRONIC MESSAGES

BACKGROUND

When users send files that are attached to an electronic message, they create multiple copies of a given file. Not only does a copy of the attachment exist in each recipient's mailbox, the attachment is often stored in other locations such as a local hard drive or file share when the user chooses to save an attachment. When a user replies with changes to the attachment they create yet another copy of the attachment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An option is presented when composing an electronic message to automatically upload and permission an attachment to the electronic message. A single click may be received to upload the attachment to a shared location (e.g. network share, online service, and the like). Permissions may be automatically set for the message recipients of the electronic message. For example, a default set of permissions and/or custom permissions may be set for each of the recipients listed on the To:/Cc:/Bcc: lines. A link to the shared location may also be automatically inserted into the electronic message along with or in place of the attachment.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
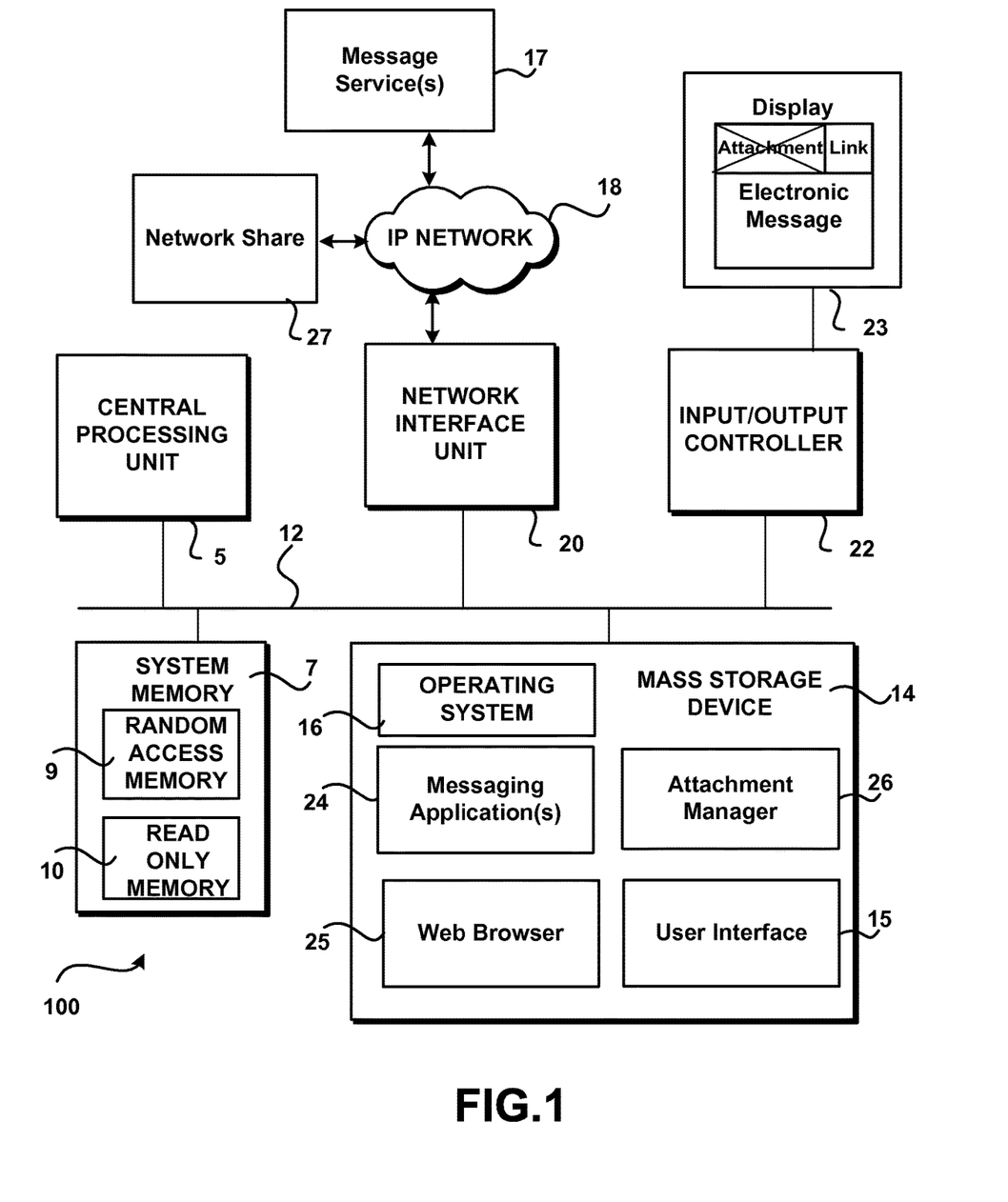
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, messaging application (s) 24, Web browser 25, and attachment manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, including one or more messaging application(s) 24 and Web browser 25.

A user interface 15 is used by a user to interact with applications and documents. Messaging application(s) 24 may be one or more different messaging applications. For example, computing device 100 may include an email application, an Instant Messaging (IM) application, an SMS, MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE or some other network based email and messaging service.

Network share 27 is configured to store content (e.g. documents, spreadsheet, Web content, and the like) that are accessible to one or more users through IP network 18. For example, network share 27 may store content that is accessible by users located at one or more locations.

Attachment manager 26 is configured to detect attachments that are associated with an electronic message and provide an option to share the attachment. Attachment manager 26 may be located externally from an application, e.g. messaging application 24, as shown or may be a part of an application. Further, all/some of the functionality provided by attachment manager 26 may be located internally/externally from a messaging application.

Attachment manager 26 is configured to detect one or more attachments to an electronic message and to present an option that when selected automatically uploads and permissions the attachment. A single click may be received to upload the attachment to a shared location (e.g. network share 27, online service, and the like). Permissions may be automatically set based on the message recipients of the electronic message. For example, a default set of permissions and/or custom permissions may be set for each of the recipients listed on the To:/Cc:/Bcc: lines. A link to the shared location may also be automatically inserted into the electronic message along with or in place of the attachment. The term "link" refers to an address that represents a location of content. For example, a link may be in the form of a Uniform Resource Locator (URL) that specifies a network location of where the content is stored. Using the link generally retrieves the content that is pointed to by the link. More details regarding the attachment manager are disclosed below.

Figure 2:
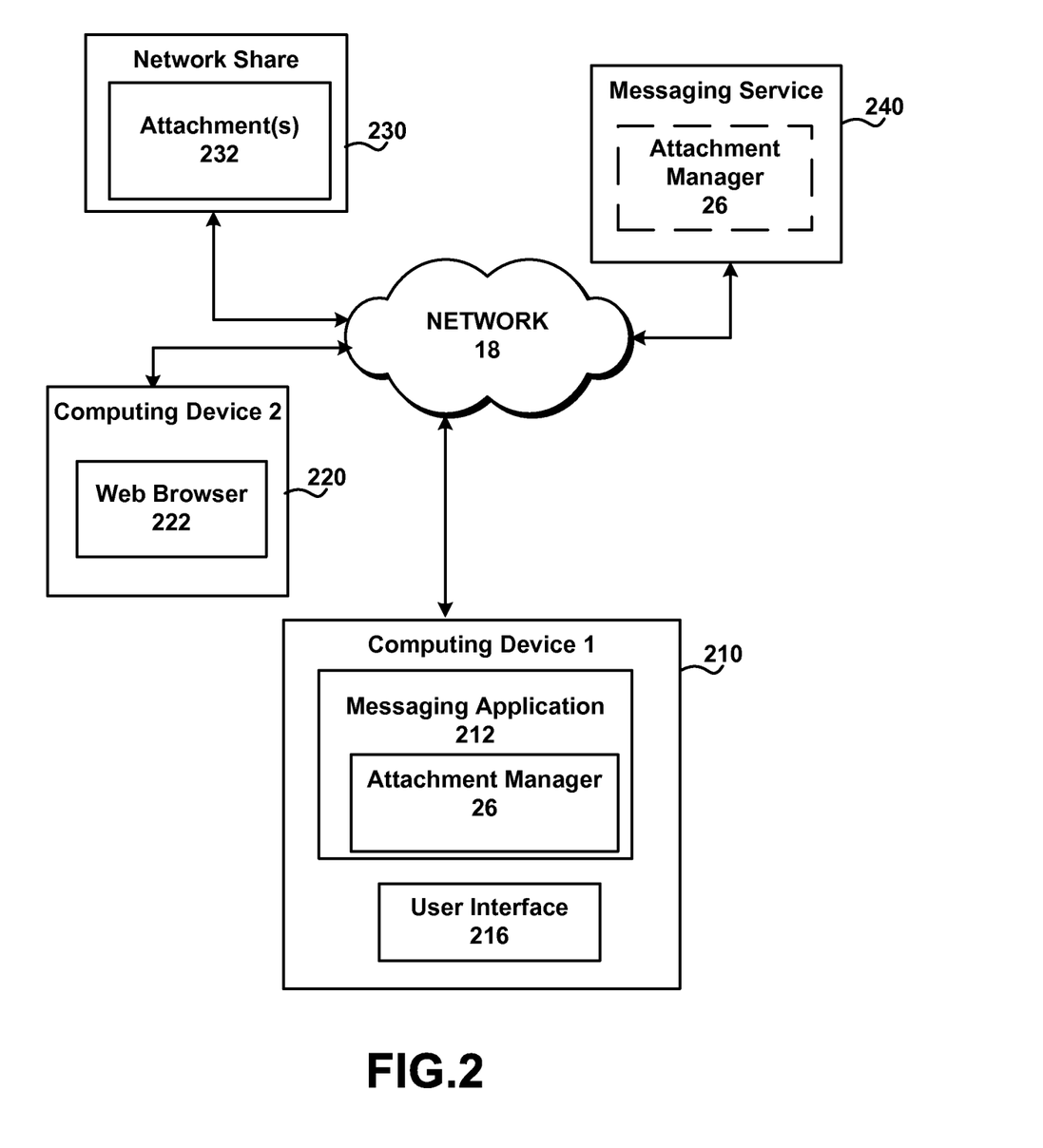
FIG. 2 shows a system for uploading and setting permissions for attachments to a shared location and inserting links within electronic messages.

FIG. 2 shows a system for uploading and setting permissions for attachments to a shared location and inserting links within electronic messages. As illustrated, system 200 includes computing device 1 (210), computing device 2 (220), network share 230 and messaging service 240.

The computing devices may be any type of computing device that is configured to perform the operations relating to sending and receiving electronic messages that include attachments and/or links to content. For example, some of the computing devices may be: mobile computing devices (e.g. cellular phones, tablets, smart phones, laptops, and the like); desktop computing devices and servers. Some computing devices may be arranged to provide an online service (e.g. messaging service 240 that is configured for sending and receiving electronic messages), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, network share 230 and messaging service 240.

Computing device 1 includes messaging application 212 and user interface 216. As illustrated, computing device 1 is used by a user to interact with electronic messages, content in a network share (e.g. content 232) and the like.

User interface (UI) 216 is used to interact with an applications and content, such as messaging application 212 and attachments that are attached to electronic messages. One or more user interfaces of one or more types may be used to interact with the content. For example, UI 216 may include the use of a context menu, a menu within a menu bar, a menu item selected from a ribbon user interface, a graphical menu, and the like. Generally, UI 216 is configured such that a user may easily interact with content and electronic messages. For example, a user may simply select an option within UI 216 to automatically upload an attachment to an electronic message to a shared data store (e.g. attachment 232 at network share 230). UI 216 may also be used to display information relating to attachments and links within an electronic message. For example, upon detection of an attachment to an electronic message, a selectable option may be shown within the message (or near the message) that allows a user to upload the attachment to a shared network location. UI 216 may also present a link in place of and/or in addition to the attachment that is uploaded to the network share. UI 216 may also be used to set/change permissions that are to be associated with the shared attachment. For example, UI 216 may be used to change read/write permissions for one or more recipients of an electronic message that includes an attachment to be shared.

Messaging application 212 may be a client based application, such as an email application, an Instant Messaging Application, a social media application, and the like. Generally, messaging application 212 is used to send and receive electronic messages of one or more types. A network based messaging service 240 may be used in addition to messaging application 212 or instead of one or more of the different messaging applications. For example, a web interface may be used to access messaging service 240.

Messaging service 240 may be used to process electronic messages between one or more computing devices, such as computing device 1 and computing device 2. Messaging service 240 may be configured to process different message types, such as SMS, MMS, email, messages for social networks and the like. Messaging service 240 may be configured with the functionality of attachment manager 26 and one or more message types may be used to communicate the electronic messages including links to shared content that are related to attachments that where included within the electronic message before being sent.

Computing device 2 includes one or more applications, such as a web browser 222 that may be configured to access a messaging service, such as a web based email service and to interact with content. For example, a web browser may be used to access an electronic message through an email service and then access content 232 stored in network share 230.

One or more network shares (e.g. Network share 230) may be used to store content to be shared between users and/or accessed remotely, such as different attachments that were initially included within an electronic message and were selected to be shared. The content may be any type of content (e.g. files such as word processing documents, spreadsheets, slides, website content and the like). Network share 230 is accessible by the computing devices that interact with the content. The network share may be associated with an online service that supports online access/interaction with content.

Attachment manager 26 is configured to detect any attachments to an electronic message and to provide an option to automatically upload the attachments to a network share and permission the attachments for sharing between users. The attachments may be to any type of content, such as word processing documents, spreadsheets, slides, website content and the like. Generally, the attachment may be to any type of content that is accessible by a computing device.

Attachment manager 26 presents one or more selectable options that when selected automatically upload the attachment(s) to a shared network location. For example, a separate option may be presented for each attachment, an option may be presented for each type of content (e.g. documents, photos, music, etc.), a single option may be presented for all of the attachments and the like. According to an embodiment, the option is a selectable menu option that allows one click uploading and setting the sharing permissions of attachment(s) to a network share. Upon selecting the upload option, a link is inserted within the electronic message that provides a recipient with a link to the shared attachment. The attachment may/may not be automatically removed from the electronic message. According to an embodiment, the attachment is removed from the electronic message before it is sent to the recipients.

Attachment manager 26 is also configured to automatically permission the attachment at the shared network location. The permissions to be set for an attachment may be predetermined. For example, all attachments may be initially set for read/write access or read access or write access. Permissions may be set based on the type of attachment (e.g. word processing documents may be set to read/write whereas photos or pictures may be set to read only). The default permissions may be set by a user. According to an embodiment, attachment manager 26 is configured to present an option to change the default permissions. For example, a user may select a change permissions option to modify the permissions for one or more of the attachments for one or more of the recipients (e.g. some recipients have read/write access whereas other recipients have read access). When the user does not select the upload option, the electronic message is sent without uploading the attachment to the network share.

Upon receipt of the message that originally included an attachment that was uploaded to the shared location, the link within the message may be used to access the attachment at the shared location.

According to an embodiment, the attachments are uploaded to the shared location before the electronic message is sent. The attachment(s) may be uploaded upon selection of the upload option or at a point before the message is delivered to the recipients. For example, the attachment(s) designated to be uploaded may be uploaded in response to the send option being selected. In this way, if a user changes their mind in uploading an attachment and/or sending the message, the attachment will not be uploaded to the shared location until the message is instructed to be sent.

FIGS. 3-7 show exemplary electronic messages including an attachment detected for automatic uploading and setting permissions. FIGS. 3-7 are for exemplary purpose and are not intended to be limiting.

Figure 3:
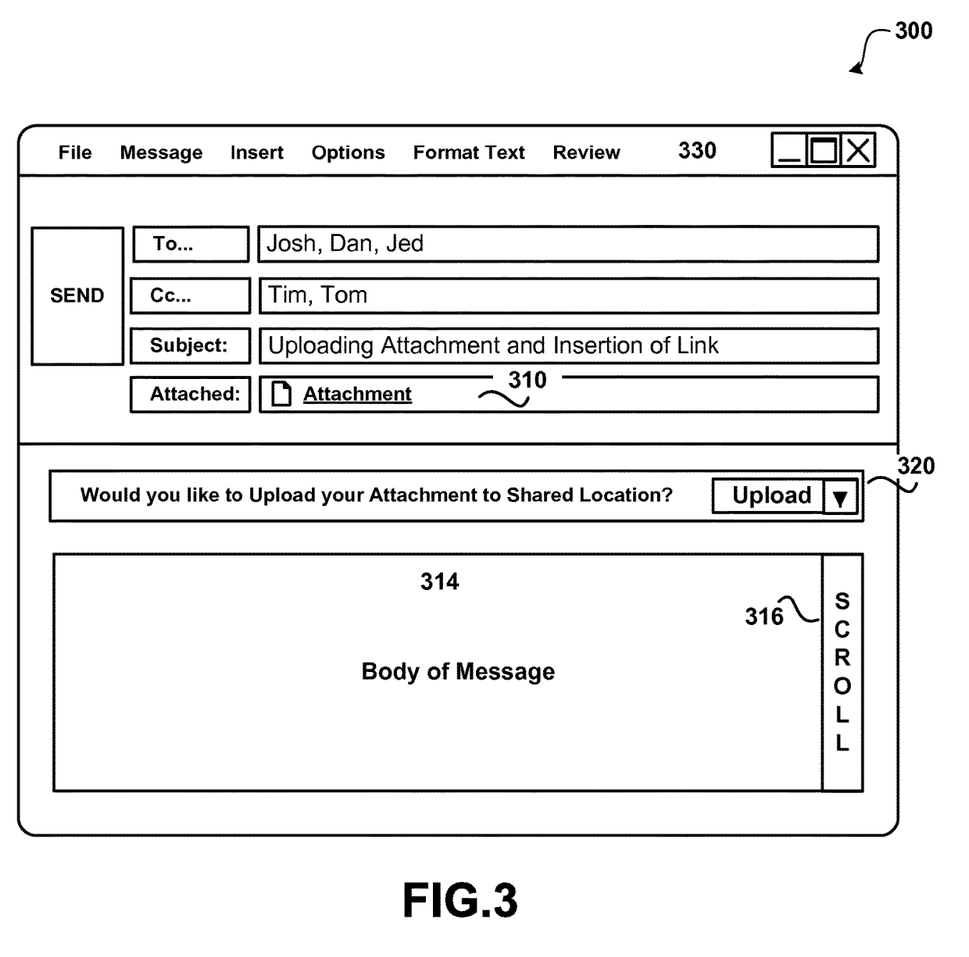
FIG. 3 shows a display of an electronic message including a detected attachment that may be uploaded to a shared location.

FIG. 3 shows a display of an electronic message including a detected attachment that may be uploaded to a shared location. As illustrated, message 300 comprises a To: field, a Cc: field, a Subject field, and a body of the message 314 and attachment 310. More or fewer fields may be included with the electronic message.

The electronic message may be accessed a number of ways. For example, a web browser may access an electronic mail service, an email application on a computing device may be configured to receive emails from one or more different services, and the like.

When electronic message 300 is created, one or more files may be attached to the message. The attachments may be to any type of content, such as word processing documents, spreadsheets, slides, websites and the like.

When an attachment is detected for the electronic message, an upload option 320 is presented with the display of electronic message 300. Upload option 320 may be displayed in different locations of electronic message. For example, the upload option may be displayed in the attachment area, to the side of message, within the message, below the message, and the like. Upload option 320 may also be displayed within the menu bar 330 and/or displayed as a different type of menu (e.g. a context menu). Upload option may include one or more options. For example, a single selectable option may be displayed to upload an attachment or one or more other options may be included in an upload option menu for setting other options (e.g. changing shared location, changing permissions, including attachment with/without link to shared content, and the like).

Figure 4:
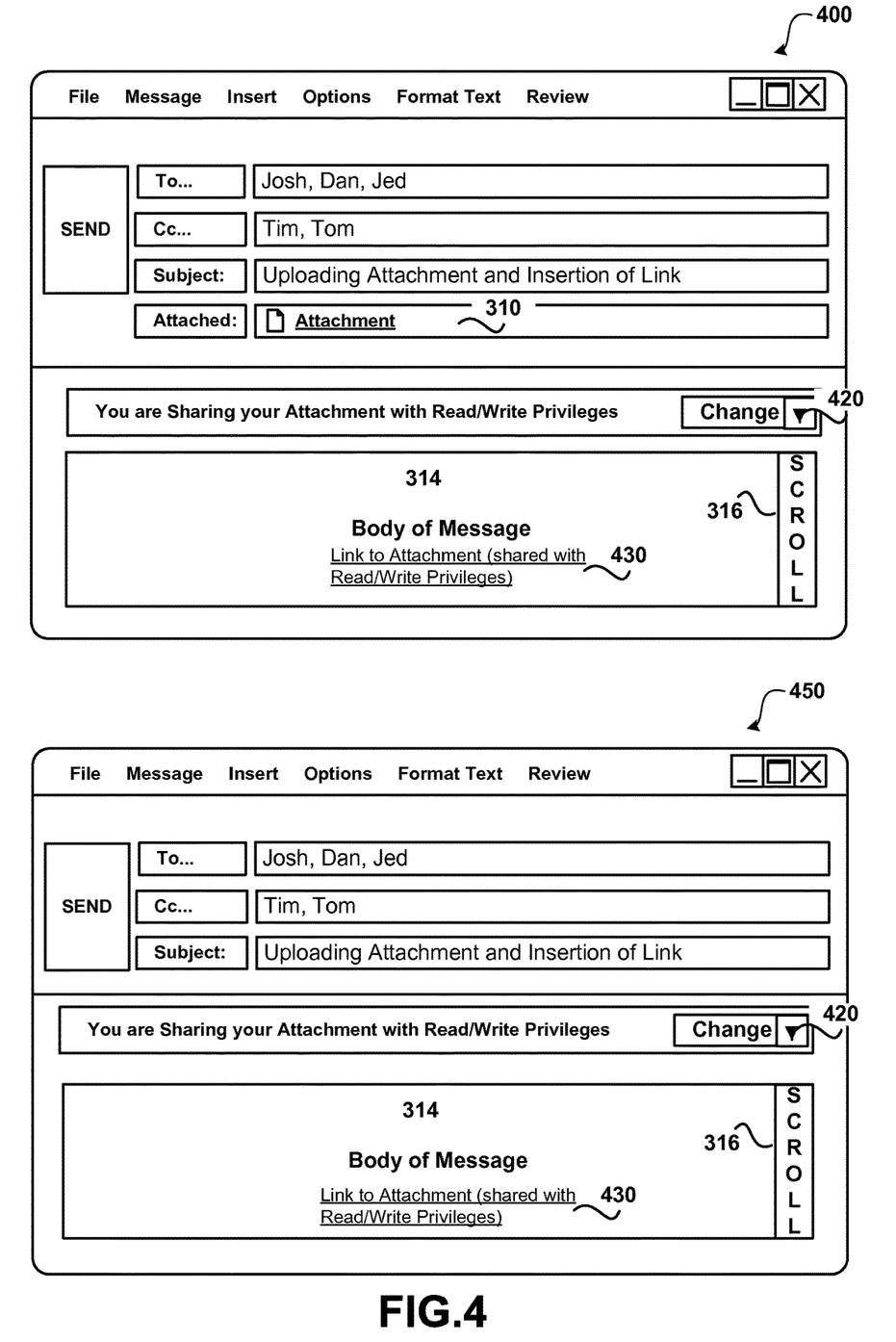
FIG. 4 shows displays of an electronic message after a user action is received to upload an attachment.

FIG. 4 shows displays of an electronic message after a user action is received to upload an attachment. As illustrated, message 400 and message 450 show a link to an attachment 430 that has been shared at a shared location that includes read/write privileges. Along with the link to attachment 430, message 400 includes attachment 310. As discussed, an attachment may be included with a link to the attachment at a shared location. According to another embodiment, the attachment may be automatically downloaded when it is received by a recipient. Link to attachment 430 may include a description of the sharing privileges for the attachment (e.g. read/write, read, write).

In response to a user selection (e.g. cursor selecting change option 420), options for changing sharing permissions is displayed to the user. Change option 420 provides an interface for a user to change the sharing privileges for an attachment. The sharing privileges may change for all/portion of the users. For example, one of the recipients may be allowed read/write privileges while other recipients are allowed read privileges. According to an embodiment, change option 420 is displayed in response to the attachment(s) being uploaded to the shared location. According to another embodiment, change option 420 may be displayed after receiving an indication to upload the attachment to the shared location but before the attachment is uploaded to the shared location or permissions set at the shared location.

Message 450 illustrates attachment 310 being automatically removed before it is sent to the recipient.

Figure 5:
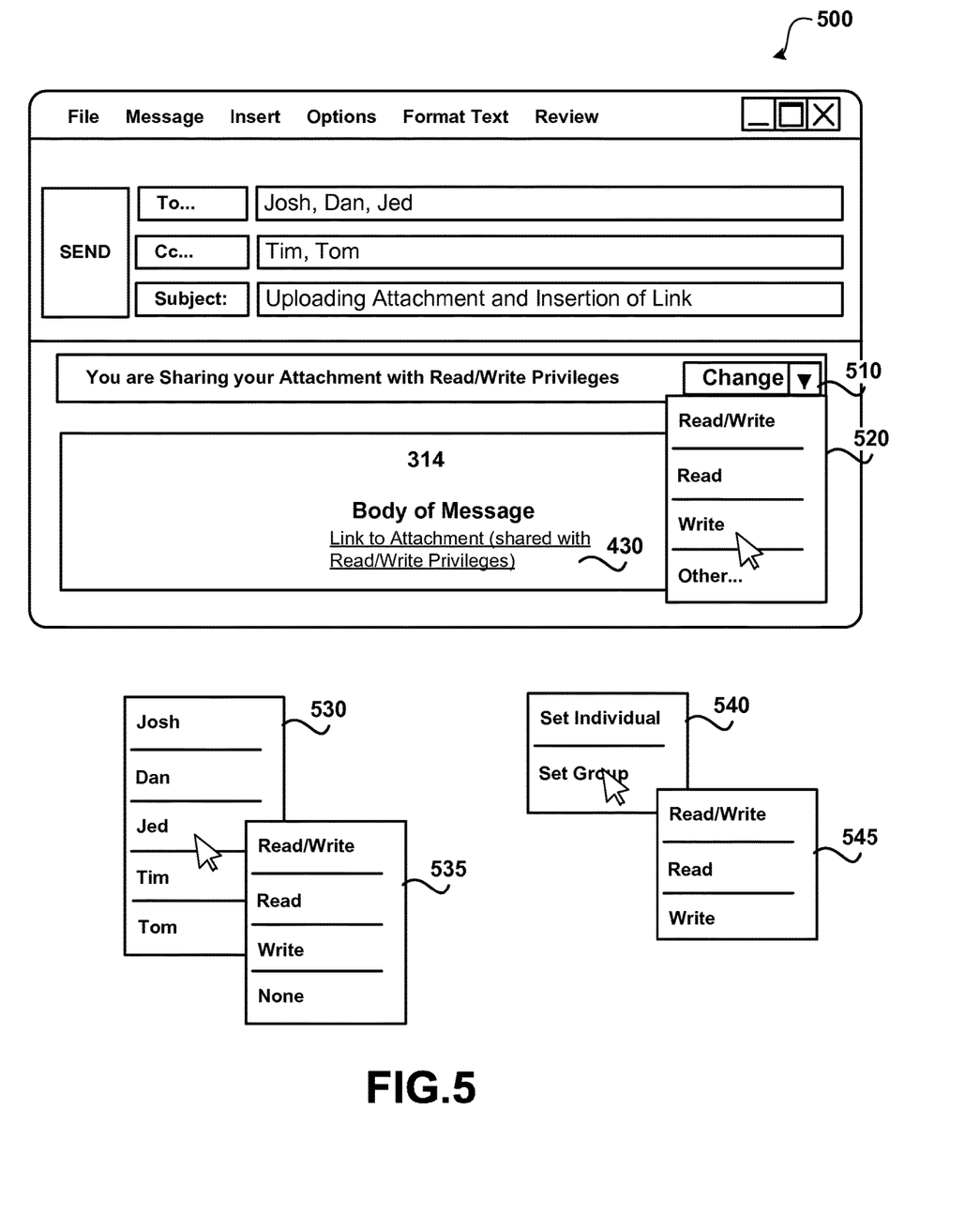
FIG. 5 shows an exemplary message that include different change permission options and menus.

FIG. 5 shows an exemplary message that include different change permission options and menus.

Message 500 shows an exemplary change menu 520 being shown in response to change option 510 being selected. As illustrated, change menu 520 includes different sharing options (read/write, read, and write) that may be associated with one or more of the recipients and an other option for providing other options to a user. Generally, change menu 520 includes a user interface that allows a user to change the sharing permissions of an attachment to be shared. Many type of user interfaces may be created for setting sharing options. For example, in response to selecting change option 510 change menu 530 or change menu 540 may be displayed.

Change menu 530 shows a menu option for each recipient to whom the message is addressed. In response to selecting a recipient from menu 530, the different sharing options for that user are displayed (e.g. read/write, read, write, none). Other options may also be provided. For example, permissions may be set such that users that are in a same group as a recipient receive the same permissions as the recipient.

Change menu 540 shows options for setting individual permissions and setting group permissions. In response to selecting the set group option, menu 545 is displayed that allows a user to change the sharing permissions for the group (e.g. read/write, read, and write). Selecting the set individual option displays one or more user interfaces that allow the user to change sharing options for one or more of the individual recipients (e.g. menu 530 may be displayed).

Figure 6:
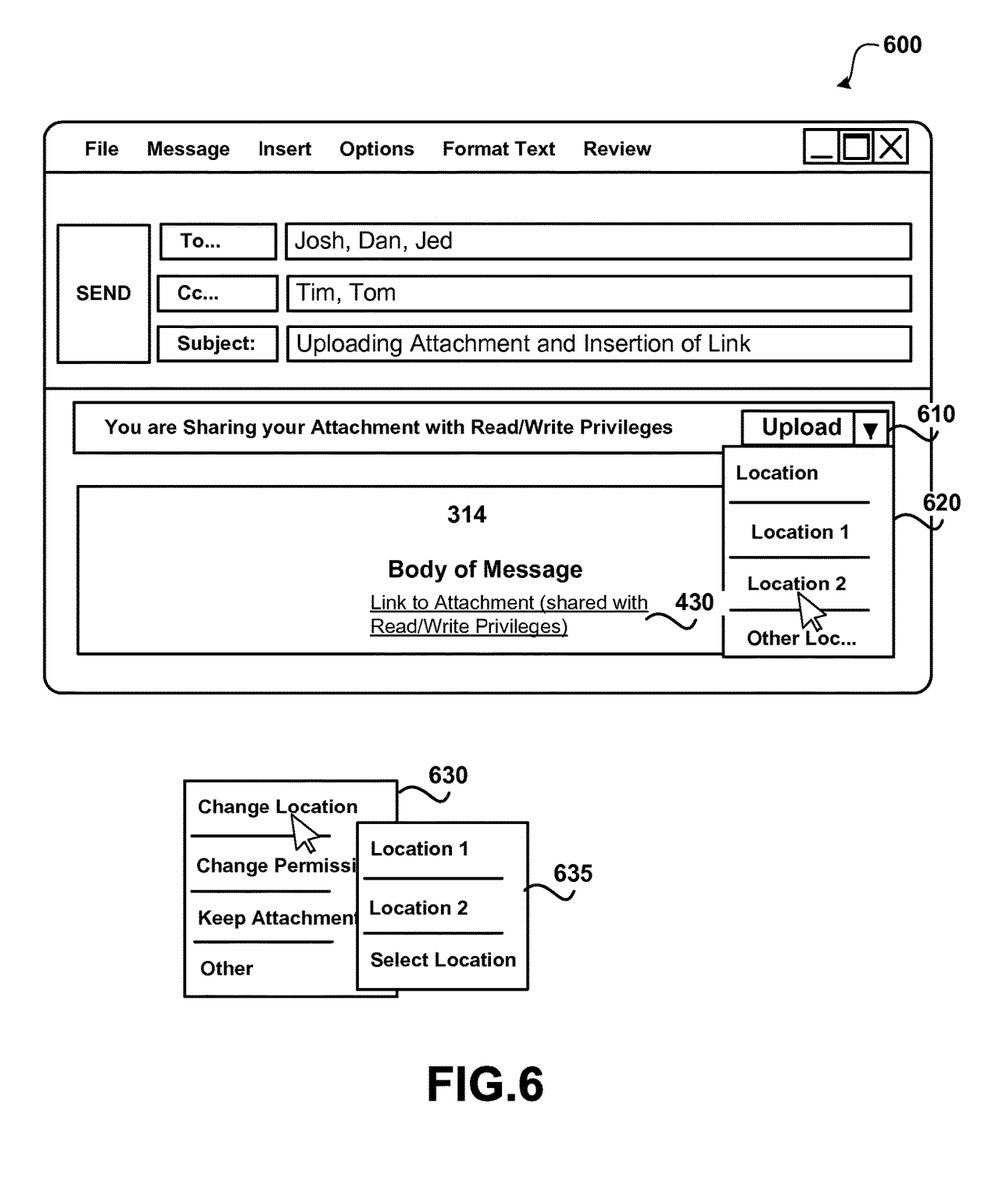
FIG. 6 shows an exemplary message that include different upload options and menus.

FIG. 6 shows an exemplary message that include different upload options and menus. Message 600 shows an exemplary update menu 620 being shown in response to update option 610 being selected. As illustrated, update menu 620 includes different location options (location 1, location 2, other locations) that may be used to set a shared location for the attachment. Generally location menu 620 displays a user interface that allows a user to change the shared location for an attachment. Many type of user interfaces may be created for setting shared locations. For example, in response to selecting upload option 610 update menu 630 may be displayed.

Update menu 630 shows a menu option for changing the shared location, a menu option to change sharing permissions (e.g. see FIG. 5), a keep attachment option, and other options. In response to selecting change location option, menu 635 may be displayed that allows a user to select a shared location. Selecting the change permissions options displays options that may be selected to set permissions for one or more of the recipients. The keep attachment option may be used to indicate when an attachment is not to be removed before the message is sent and the attachment has been uploaded to the shared location. Other options may also be provided.

Figure 7:
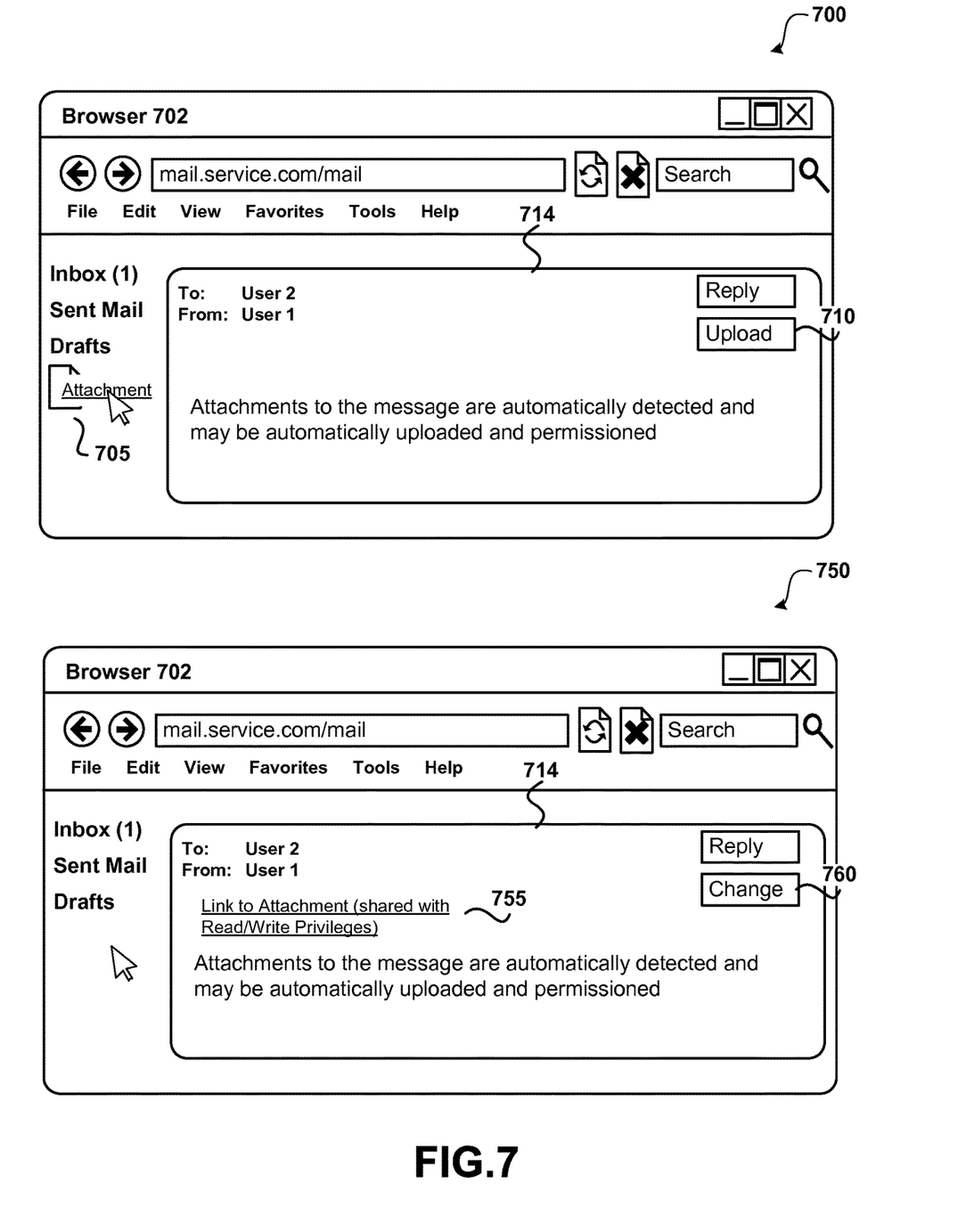
FIG. 7 shows electronic messages within a browser window that include an option to upload and permission an attachment to a shared location.

FIG. 7 shows electronic messages within a browser window that include an option to upload and permission an attachment to a shared location.

Message 700 shows an upload option 710 being shown in response to an attachment (e.g. attachment 705) being detected. The attachment may be detected at different times. The attachment may be automatically detected in response to a scan of the message at predetermined times and/or when the content is attached to the message. For example, an attachment may have been included within a message that is forwarded to another user in another message. In this way, an attachment that does not originally originate with the sending user may be shared to different users. In response to selecting the upload option menu 710, the attachment is automatically uploaded and permissions set for sharing at a shared location.

Message 750 shows a change option 760 that may be selected to change the sharing options for the attachment(s). A link to the attachment 755 is also shown with the display of the message 714 that includes a brief description of the sharing permissions for the attachment. As illustrated, attachment 705 has been removed from message 750. As discussed herein, various options may also be presented to a user for changing uploading/sharing options that are associated with the attachment(s) to the message (See FIGS. 5 and 6 and related discussion).

Figure 8:
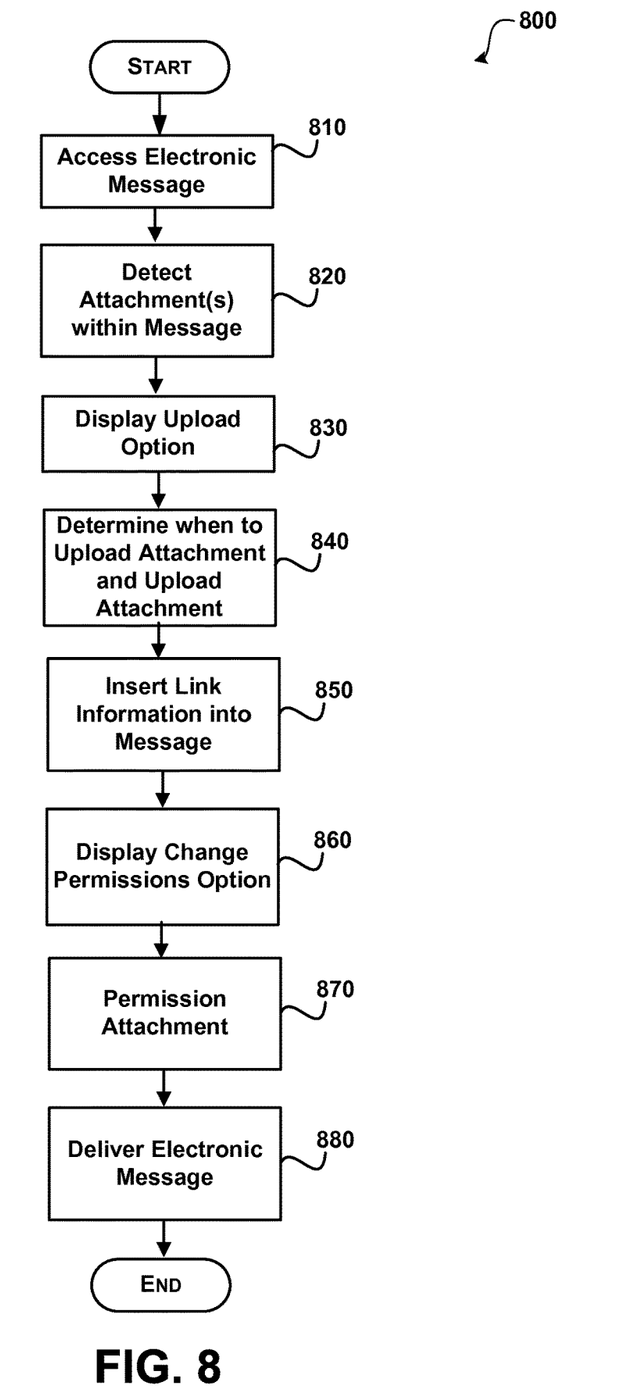
FIG. 8 shows an illustrative process for automatic upload and setting permissions for an attachment to an electronic message.

FIG. 8 shows an illustrative process for automatic upload and setting permissions for an attachment to an electronic message. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 800 moves to operation 810, where the electronic message is accessed. The electronic message may be any electronic message that includes an attachment. According to an embodiment, the electronic messages are email messages. Other messages may also include links, such as SMS, MMS, Instant Messages, social network messages, and the like.

Flowing to operation 820, any attachments that are associated with the electronic message are detected. The detection may occur at different times. For example, the detection may occur: in response to a user attaching an attachment to the message; in response to a message being created to send the attachment to another recipient (e.g. forwarding a message, replying to a message); in response to a user input (e.g. a menu option is selected) and the like. The attachment may be contained anywhere within a thread of the electronic message (e.g. within a first reply to a message, a third reply, the original message, and the like). The attachments may be to any type of content, such as word processing documents, spreadsheets, slides, website content and the like. Generally, the attachment may be to any type of content that is accessible by a computing device.

Moving to operation 830, an upload option is displayed. According to an embodiment, the upload option is displayed with a display of the message in response to an attachment being detected. When the upload option is selected by a user, the attachment is uploaded to a shared location and sharing permissions are set for the attachment in the shared location. A single click may be used to upload one or more of the detected attachment(s) to an electronic message.

Flowing to operation 840, a determination is made as to when to upload the attachments) to the shared location(s). According to an embodiment, the attachments are uploaded to the network share before the electronic message is sent. The attachment(s) may be uploaded upon selection of the upload option or at a point before the message is delivered to the recipients. For example, the attachment(s) designated to be uploaded may be uploaded in response to the send option being selected. In this way, if a user changes their mind in uploading an attachment and/or sending the message, the attachment will not be uploaded to the network share until the message is instructed to be sent. The attachment is uploaded at the determined time.

Transitioning to operation 850, a link is inserted into the electronic message that when used accesses the attachment at the shared location. According to an embodiment, when the link is inserted into the electronic message, the corresponding attachment is removed from the message. According to another embodiment, the attachment is not removed from the message.

Moving to operation 860, a change permissions option is displayed. The change permission option is selected by a user to permission the attachment at the shared location in a different manner then is set by default. For example, a user may select the change permissions option to modify the permissions for one or more of the attachments for one or more of the recipients (e.g. some recipients have read/write access whereas other recipients have read access).

Flowing to operation 870, the permissions for the attachment are set at the shared location. According to an embodiment, the permissions are set using a default set of permissions in response to the attachment being uploaded to the shared location. The permissions to be set for an attachment may be predetermined. For example, all attachments may be initially set for read/write access or read access or write access. Permissions may be set based on the type of attachment (e.g. word processing documents may be set to read/write whereas photos or pictures may be set to read only). According to an embodiment, when the permissions are not successfully set at the shared location, a warning message is provided that indicates that the permissions were not configured as specified.

Transitioning to operation 880, the electronic message is delivered to the recipients. When the upload option was selected before the message was sent, the recipient of the message will be able to access the attachment at the shared location using the provided link that is within the electronic message.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
    detecting an attachment that is added to an electronic message that is being composed; displaying an upload option to upload the attachment to a shared location before receiving a selection to send the electronic message and during a time that the electronic message is being composed, wherein displaying the upload option includes enabling the upload option to: display a first menu option that enables changing of the shared location; display a second menu option that enables changing of one or more sharing permissions; and display a third menu option that, if selected, enables the attachment already included in the electronic message to continue to be kept in the electronic message while sending the message; and in response to receiving a selection of at least one of either the first or second menus of the upload option, uploading the attachment to the shared location and automatically setting permissions for sharing the uploaded attachment at the shared location, wherein automatically setting permissions for the uploaded attachment comprises setting default permissions for each recipient of the electronic message, and if the third message option to keep the attachment in the electronic message is not selected, removing the attachment from the electronic message and inserting a link into the electronic message to the uploaded attachment at the shared location; and providing a warning when the default permissions are unable to be set.

2. The method of claim 1, further comprising displaying a change option that when selected presents one or more options to change a default permission for at least one recipient.

3. The method of claim 2, wherein the change option enables the default permission for the at least one recipient to be changed to a custom permission.

4. The method of claim 2, wherein the change option enables the default permission for the at least one recipient to be changed to a permission that is based on a type of attachment.

5. The method of claim 2, wherein the change option enables the default permission for the at least one recipient to be changed to a permission that is based on the at least one recipient.

6. The method of claim 1, further comprising sending the electronic message to each recipient after uploading the attachment to the shared location.

7. The method of claim 1, further comprising inserting an indication within the electronic message that indicates the attachment is stored at the shared location.

8. The method of claim 1, wherein the first menu option comprises one or more selectable shared network location options.

* * * * *